(12) United States Patent
Pont

(10) Patent No.: US 6,375,273 B2
(45) Date of Patent: Apr. 23, 2002

(54) HUB FOR A SPOKED WHEEL, SUCH AS A BICYCLE WHEEL

(75) Inventor: Hervé Pont, Vinzelles (FR)

(73) Assignee: Mavic S.A., Saint Trivier sur Moignans (FR)

(*) Notice: Subject to any disclaimer, the term of this patent is extended or adjusted under 35 U.S.C. 154(b) by 0 days.

(21) Appl. No.: 09/742,237

(22) Filed: Dec. 22, 2000

(30) Foreign Application Priority Data

Dec. 23, 1999 (FR) .............................................. 99 16692

(51) Int. Cl.⁷ .............................. B60B 1/02; B60B 21/06
(52) U.S. Cl. ........................................ 301/59; 301/110.5
(58) Field of Search ........................... 301/105.1, 110.5, 301/110.6, 74, 75, 78, 80, 81, 84, 54, 55, 56, 57, 58, 59, 60, 61

(56) References Cited

U.S. PATENT DOCUMENTS

| | | | | |
|---|---|---|---|---|
| 4,300,804 A | * | 11/1981 | Hasebe | 301/56 |
| 4,448,456 A | * | 5/1984 | Pfundstein | 301/58 |
| 5,372,407 A | * | 12/1994 | Brown et al. | 301/110.5 |
| 5,429,421 A | * | 7/1995 | Watson | 301/61 |
| 5,626,401 A | | 5/1997 | Terry, Sr. et al. | 301/59 |
| 5,795,036 A | | 8/1998 | Campagnolo | 301/59 |
| 5,820,224 A | * | 10/1998 | Dimatteo, Jr. | 301/105.1 |
| 5,882,088 A | * | 3/1999 | Yahata | 301/59 |
| 6,010,197 A | * | 1/2000 | Crosnier et al. | 301/59 |
| 6,244,667 B1 | * | 6/2001 | Dietrich | 301/59 |
| 6,257,678 B1 | * | 7/2001 | Brookey et al. | 301/105.1 |
| 6,318,810 B1 | * | 11/2001 | Miyake et al. | 301/110.5 |

FOREIGN PATENT DOCUMENTS

| | | |
|---|---|---|
| DE | 3612772 | 10/1987 |
| EP | 0764551 | 3/1997 |
| FR | 2653069 | 4/1991 |

\* cited by examiner

*Primary Examiner*—S. Joseph Morano
*Assistant Examiner*—Long Bao Nguyen
(74) *Attorney, Agent, or Firm*—Greenblum & Bernstein, P.L.C.

(57) ABSTRACT

A hub body including two lateral flanges having buttonhole-shaped borings provided for hooking the spokes with a large cross-section portion and a small cross-section portion. Each of the flanges includes an approximately axial barrel extended by a disk, and that the large cross-section portion is located in the area of the disk, and the small cross-section portion is located in the area of the barrel. The small cross-section portion is located at the base of the large cross-section portion, with reference to the direction in which the spoke exerts a traction on the flange when it is mounted and tensioned. The invention also relates to a hub as well as a bicycle spoke wheel.

11 Claims, 3 Drawing Sheets

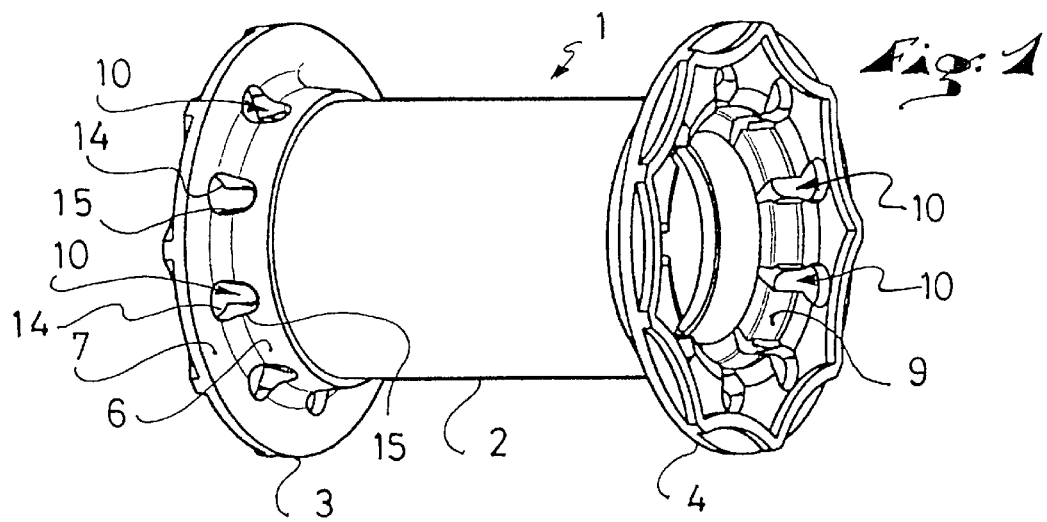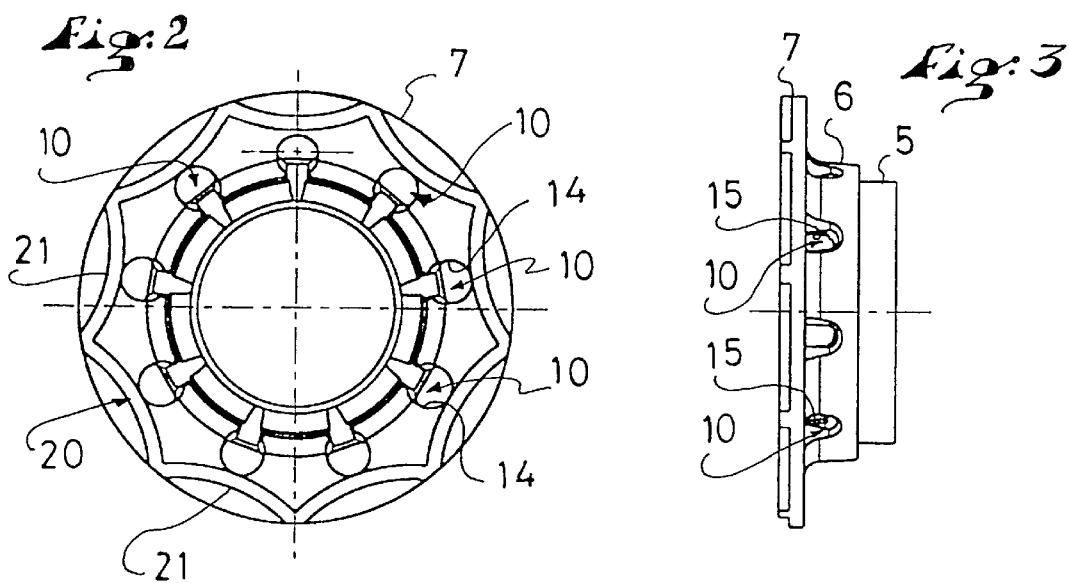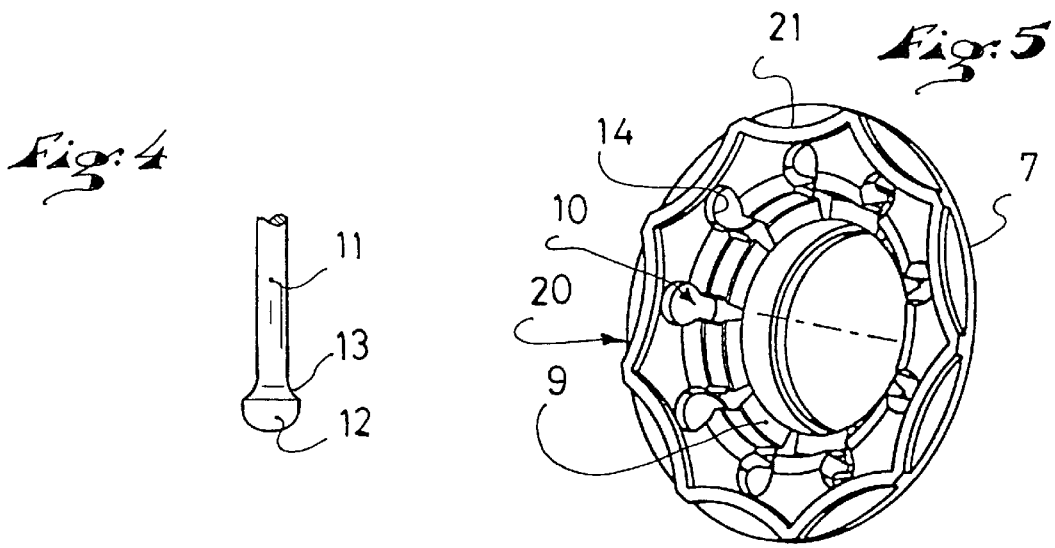

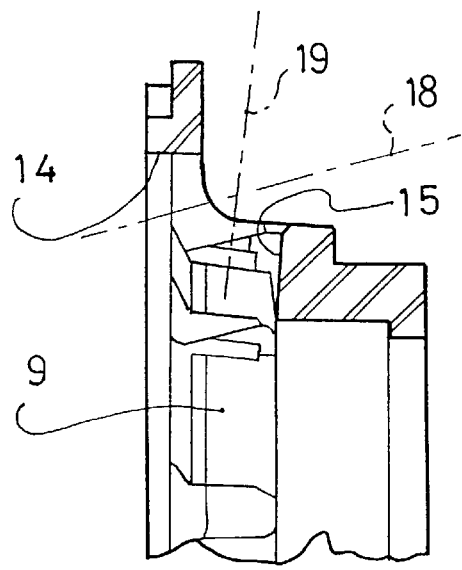
*Fig: 6*
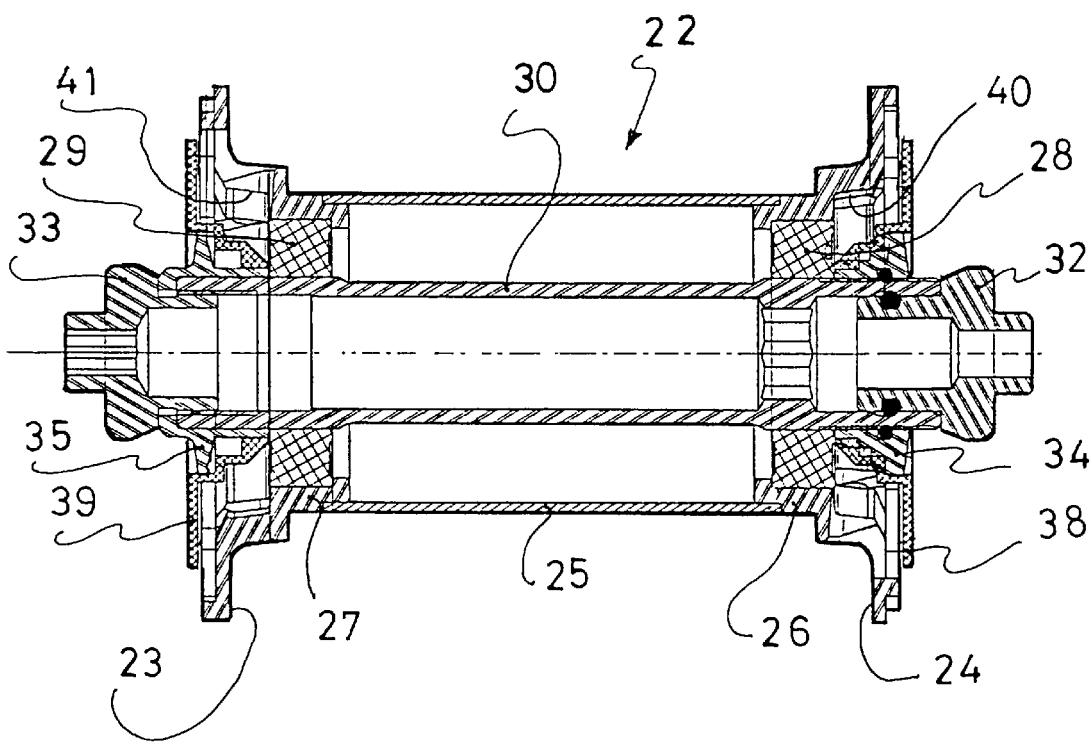
*Fig: 7*

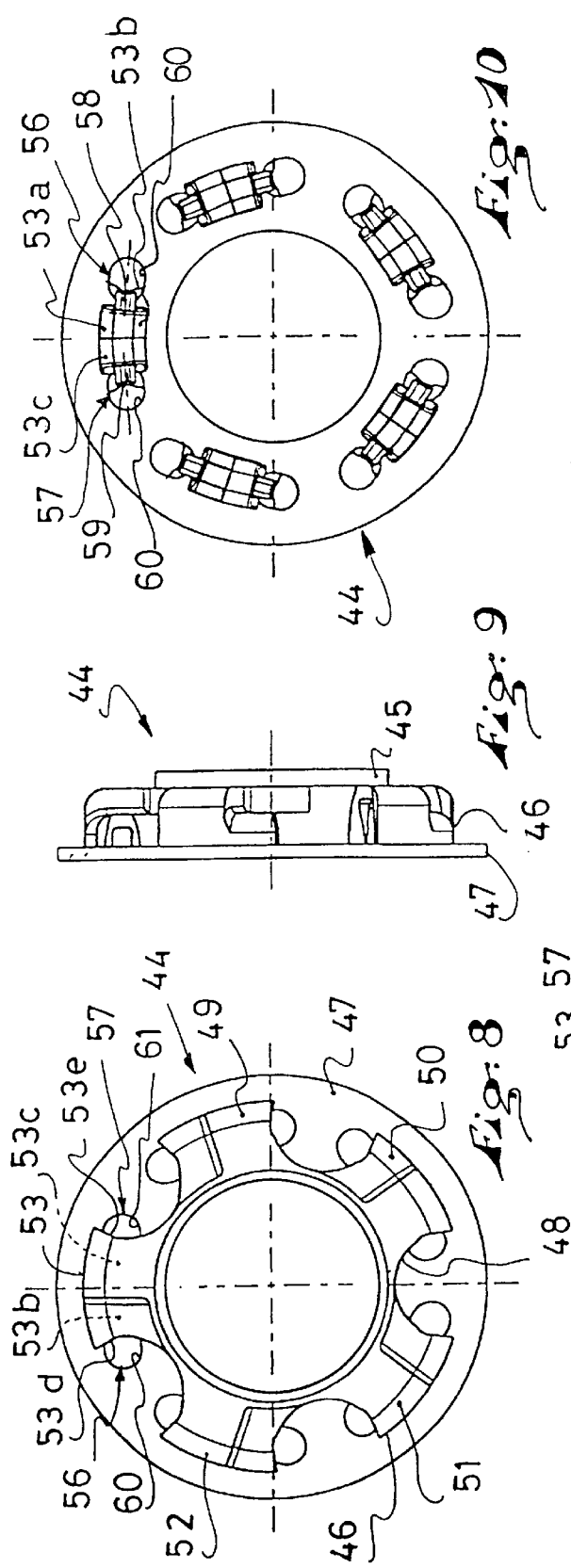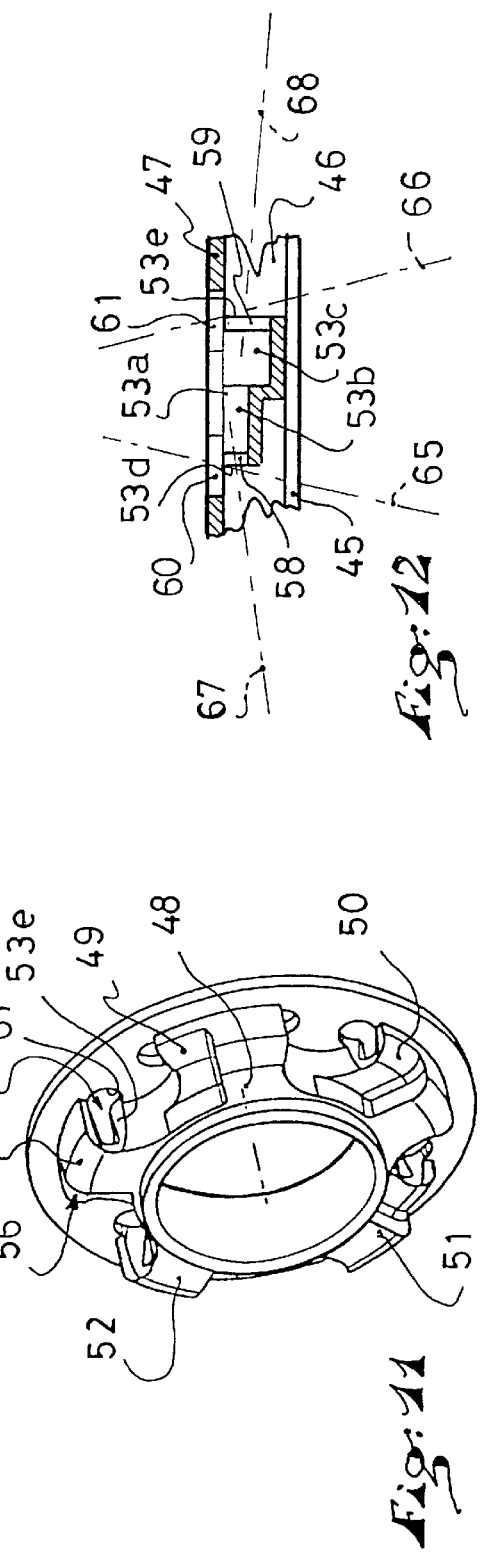

HUB FOR A SPOKED WHEEL, SUCH AS A BICYCLE WHEEL

BACKGROUND OF THE INVENTION

1. Field of the Invention

The present invention relates to the hub body for a spokes wheel, such as a bicycle wheel in particular. The invention also relates to a hub having such a hub body, as well as a spoked wheel including such a hub.

2. Description of Background and Relevant Information

In a known manner, a bicycle wheel includes a rim, a hub, and spokes for connecting the rim to the hub. In addition, the spokes are usually adjustable in tension.

Bent spokes and radial spokes are known among the commonly used spokes. Usually, a hub provided with bent spokes has two lateral disks, or disk-shaped portions, oriented in radial planes. The spokes are fitted into borings of the disks.

For radial spokes, the spoke head is retained by a surface portion of the flange that is oriented parallel to the hub axle.

To retain the spoke head, a closed boring can be obtained on this surface portion. In this case, the spoke must be fitted into this boring along a radial direction. Such a method for mounting the spokes is complex to carry out; indeed, the spoke, when being fitted, interferes with the hub shaft. Moreover, such a closed boring is not compatible with a double head radial spoke.

Another solution consists of retaining the spoke head in the area of an aperture. The aperture can be obtained in the wall of the flange, for a radial spoking method, or in the area of radially extending projections for a crossed spoking method. Each spoke is positioned in its aperture with a minimum of necessary displacement. The spoke mounting operation is indeed simplified.

Because the aperture is an open boring, it is capable of deforming more easily under the effect of the spoke tension. It is then necessary to reinforce the wall thickness or to add an additional washer or ring to achieve a satisfactory level of resistance to tearing. Such a ring is described, for example, in the published patent application No. EP 764 551.

Another solution consists of obtaining buttonhole-shaped borings having a portion with a large cross-section for engaging the spoke head, and a portion with a small cross-section for retaining the spoke.

However, such a boring proves cumbersome because of the portion with a large cross-section.

The published patent application No. DE 36 12 772 proposes a solution that consists of obtaining the large cross-section and the small cross-section of the buttonholes in two different planes, the portion with a large cross-section being bored in a radial portion of the flange.

However, the construction proposed is not completely satisfactory. Indeed, the portions with a large cross-section are closer to the hub axle than the portions with a small cross-section. As a result, they are relatively close to one another, which diminishes the rigidity of the flange. Furthermore, the portions with a small cross-section which retain the spoke heads are relatively distant from the axle. Therefore, relatively thick flanges are necessary to achieve a satisfactory rigidity.

SUMMARY OF THE INVENTION

An object of the invention is to propose an improved hub body and hub in the sense that they facilitate the assembly operations, are smaller sized, and are resistant and lightweight.

Another object of the invention is to propose a hub body that is easy to construct.

Other objects and advantages of the invention will become apparent from the following description.

The hub body according to the invention includes two lateral flanges having buttonhole-shaped borings provided for hooking the spokes with a portion with a large cross-section and a portion with a small cross-section. According to the invention, at least one of the flanges includes an approximately axial barrel extended by a disk, and the portion with a large cross-section is located in the area of the disk and the portion with a small cross-section in the area of the barrel, the portion with a small cross-section being located at the base of the portion with a large cross-section, with reference to the direction in which the spoke exerts a traction on the flange when it is mounted and tensioned.

The hub according to the invention includes a shaft and a hub body as previously described.

The borings are generally buttonhole-shaped, the spoke heads being introduced in the portion with a large cross-section, and the spoke being retained in the portion with a small cross-section. Therefore, the mounting operation is simplified.

However, unlike the buttonhole described in the document DE 36 12 772, the portion with a large cross-section is here located on the other side of the portion with a small cross-section. As a result, a relatively larger surface is available to house it. Moreover, the portion with a small cross-section is brought back toward the axle of the hub, resulting in a gain in rigidity and weight.

BRIEF DESCRIPTION OF DRAWINGS

The invention will be better understood from the description that follows, with reference to the annexed drawings that are an integral part thereof, and in which:

FIG. 1 shows a perspective view of a hub body according to a non-limiting embodiment of the invention;

FIG. 2 shows a front view of a flange of the hub body of FIG. 1;

FIG. 3 shows a side view of the flange of FIG. 2;

FIG. 4 shows the end of a radial spoke;

FIG. 5 shows a perspective view of the flange of FIG. 2;

FIG. 6 shows a section of the hub of FIG. 2 in the area of the boring of a flange;

FIG. 7 shows a cross-section of a complete hub according to a particular embodiment of the invention;

FIG. 8 shows a front view of a flange according to a second embodiment of the invention;

FIG. 9 shows a side view of the flange of FIG. 8;

FIG. 10 shows a rear view of the flange of FIG. 8;

FIG. 11 shows a perspective view of the same flange; and

FIG. 12 shows a cross-sectional view in the area of the two borings of an arm.

DETAILED DESCRIPTION OF THE INVENTION

FIG. 1 shows a hub body 1 provided for a bicycle wheel. In a known fashion, the hub body 1 has a hollow and cylindrical central portion 2 rotating about the axis defined by the hub, and two lateral flanges 3 and 4.

The hub body 1 of FIG. 1 is provided to obtain a complete hub with a shaft and bearings, possibly a free wheel mechanism in the case of a rear wheel. Various constructions are possible, some of which are described subsequently. In the embodiment shown, the central portion and the two flanges are three distinct elements assembled to one another. This is not limiting, and the hub body could also be made unitary.

A flange of the hub 1 is shown in FIGS. 2 and 3. This flange has a nesting portion 5 provided to cooperate with the tube that forms the central portion 2 of the hub. According to the embodiment shown, the nesting portion has an outer diameter that is equal to the inner diameter of the central tube. Possibly, this portion can be machined specifically to receive the tube, or for the mounting of a bearing.

An axial barrel-shaped portion 6 is coupled to the nesting portion 5. The barrel 6 is extended outwardly by a radial disc 7, away from the axle of the hub body. The inner wall of the barrel defines a cavity 9.

Borings 10 are provided for hooking the end of a radial spoke. Such a spoke end is shown in FIG. 4. In a known fashion, the spoke body 11 is a lengthy tube that is terminated by an enlarged head 12. Possibly, the surface 13 located beneath the head is provided with a particular shape, in particular a rounded shape so as to cooperate with the edges of the borings. The head can also have a particular cross-section, especially elongated, square, or rectangular, so as to prevent the rotation of the spoke during its tensioning.

The figures show a flange with nine borings. The invention is not limited to this particular number; the number of borings depends on the number of spokes in the wheel and, therefore, on the degree of rigidity desired for the wheel.

According to the invention, each of the borings 10 is obtained partially in the barrel 6 and partially in the disk 7.

In the first embodiment shown, each boring 10 is demarcated by a large cross-section 14 located in the disk, and a small cross-section 15 located in the barrel, the two cross-sections communicating with one another at the border between the barrel and the disk.

The large cross-section 14 is obtained along a circular cutout having a larger diameter than the width of the small cross-section.

The opening defined by the large cross-section 14 has greater dimensions than the overall dimensions of a cross-section of the head 12 of the spoke, such that the spoke head can go through the large cross-section. Preferably, these dimensions are slightly greater and are sufficient for introducing the spoke head with the body inclined along a direction close to an axial direction referenced by the dot-and-dash line 18 in FIG. 6. Assuming that the large cross-section has a circular perimeter, the engaging direction 18 passes substantially by its center, and it is oriented approximately perpendicular to the disk.

The small cross-section 15 is presented as an aperture whose width is close to the diameter of the body 11 of the spoke in the vicinity of the head. The depth of the aperture is close to the diameter of the spoke body, such that the spoke body can be positioned in the small cross-section, along a direction approximately parallel to the plane defined by the disk, without interfering with the disk.

The direction in which the spoke is retained is close to a radial direction. It is referenced by the dot-and-dash line 19 in FIG. 6. In this position, the portion of the spoke body 11 located beneath the spoke head is engaged in the opening defined by the small cross-section. The edges of this small cross-section retain the spoke head by its surface 13 located beneath the head, on a portion of its periphery. The spoke head is housed in the cavity 9 defined by the inner wall of the barrel.

The spoke positioning operation is carried out in the following manner.

Upon engagement, the spoke is presented along the direction defined schematically by the reference numeral 18, the head facing a portion with a large cross-section. Relative to the plane defined by the disk, the spoke is on the side of the median plane of the hub. Next, the spoke is displaced along the direction which it defines, until the head has gone through the boring; then the spoke is set upright along the direction 19; it is then introduced into the portion with a small cross-section. In this position, the spoke head has come closer to both the hub axis and the median plane of the hub. Furthermore, the operation direction 19 is quite different from the engaging direction 18. Under these conditions, it is to be understood that it would not be possible to bring out the spoke head through the large cross-section 14 by maintaining the spoke oriented parallel to the direction 19. The hub body is indeed retained by the disk. Thus, when the wheel is in service, the spoke cannot disengage from the flange, even if its tension is accidentally reduced.

It is noted that in this embodiment, the portion with a small cross-section is located at the base of the portion with a large cross-section, with reference to the direction in which the spoke exerts a traction on the flange, i.e., it is closer to the hub axis than the portion with a large cross-section. Moreover, the engaging of the end of a spoke into the flange is carried out by presenting the end in question on the inner side of the disk, i.e., the side oriented toward the median plane of the hub.

On the plane of stresses, because the portions with large cross-sections are carried by the disk that is oriented radially and approximately parallel to the direction of traction of the spokes, the portions with large cross-sections efficiently contribute to reinforcing the portions with a small cross-section, which increases the resistance to tearing. Moreover, the portions with a large cross-section are located on the outside with respect to the portions with a small cross-section. As a result, they are located over a larger circumference than the portion with a small cross-section. Although their cutout has larger dimensions, there remains between two successive large cross-sections enough flange material to obtain a satisfactory rigidity, which would not have been the case if the portions with a large cross-section had been obtained closer to the axle with respect to the portions with a small cross-section.

To further improve the tear resistance of the borings, the invention provides to locally reinforce the disk 7 by a projecting beam 20. With reference to FIGS. 2 and 5, the beam 20 extends continuously in a zone of the disk comprised between the borings 10 and the peripheral edge. In the embodiment shown, the beam includes a series of corrugations 21 whose low point, i.e., the point that is the closest to the axle of the hub is located toward each boring 10, and the high point, i.e., the farthest from the axle of the hub is located at equal distance from two adjacent borings.

The beam is preferably made integral with the remainder of the flange. It contributes to a better distribution, in the disk, of the stresses resulting from the tension of the spokes.

FIG. 7 shows, by way of illustration of the invention, a front hub 22 including two flanges 23 and 24 that are similar to that which has been described previously. The flanges are connected by a central tubular spacer 25 whose ends are nested on the nesting portions 26 and 27 of the flanges.

Possibly, the flanges and the spacer are adhered to one another, or assembled by any other appropriate means.

Bearings 28 and 29 are housed in the nesting portions of the flanges opposite the spacer 25. A shaft 30 is mounted within the bearings 28 and 29. At the ends, the shaft has two end-pieces 32 and 33 that are provided to offer a support to the arms of the fork, and to allow therethrough a quick lock pin. The adjusting of the operational clearance of the assembly along an axial direction is done in a conventional manner, for example, by end retainers 34 and 35 screwed on the shaft.

Preferably, washers 38 and 39 are inserted between the retainers 34, 35 and the bearings. These washers have a slightly smaller outer diameter than the outer diameter of the disk of the flange. They seal the cavities 40 and 41 of the barrels, and they are located at a distance from the disk corresponding approximately to the thickness of a spoke head. In fact, the washers are elastically deformable, and their distance with respect to the disk is provided such that upon engagement of the spoke, the spoke head slightly forces against the washer when its orientation changes. Thus, there is a hard point to cross at the time the spoke is set upright from its engaging direction to its service direction. Whatever occurs, the washer prevents the spoke from recovering its engaging direction, the direction 18 in FIG. 6, such that the spoke does not run the risk of disengaging on its own during the assembly operations.

When the wheel is mounted, the washers hide the cavity of the flanges and the spoke heads.

The mode of construction of the hub that has just been described is not limiting, and other constructions could also be suited. In particular, rather than taking support against the flanges, the tubular spacer could be nested within the nesting portions, and take support directly on the outer bearing cages. The spacer and the flanges could also be obtained in a single piece. Still other constructions are possible.

For the hub that has just been described, the flanges can be obtained by molding, in particular pressure molding, for example in aluminum alloy, magnesium alloy, or any other appropriate alloy. They could also be machined from the block.

The flanges can also be made of a sheet metal formed by successive strikes. For such a flange made out of a sheet metal, it is possible to replace the corrugations of the beams by a single reinforcement rib located at the outer periphery of the disk.

The central spacer is made, for example, of aluminum alloy, or of any other appropriate material.

The flanges which have been described up until now are suitable for one-headed or two-headed radial spokes, and they are arranged according to a radial spoking method.

FIG. 8 and the subsequent figures show a flange 44 suitable for a crossed spoking method. More specifically, this flange is provided for a so-called tangent assembly where the spokes are mounted two by two, head to tail, along a direction tangent to the central spacer of the hub body. This flange can be associated with a flange of the same type, in the case where the two sets of spokes of the wheel are of the crossed type, or with a flange as that which has been described previously for a set of radial spokes.

The flange 44 has, as the preceding one, a nesting portion 45, a barrel 46, and an external disk 47.

As in the preceding case, the nesting portion has the function of ensuring the connection with the central spacer in the case where the hub is constructed in a plurality of elements assembled to one another. This portion is however optional.

The barrel 46 has a substantially more complex shape than in the preceding case; this is due to the direction of the spokes that is different. The barrel has a cylindrical central portion 48 rotating about the axle of the hub, and a plurality of radial arms 49, 50, 51, 52, 53 corresponding to the start of two spokes. The number of arms is not limiting to the invention. The arms 49–53 extend along the disk in the direction of its periphery and are distributed uniformly.

To simplify the description, only one of the arms, in this case the arm 53, is going to be described in detail. Each arm is hollow, i.e., it defines a cavity 53a open toward the outside of the flange. The cavity is divided into two portions 53b, 53c, having a different depth along a direction parallel to the hub axle and juxtaposed along a radial plane. The shallowest cavity is large enough to receive the spoke head, and the deepest cavity is also provided to receive a spoke arm but in an offset manner in the direction of the median plane of the hub, so as to enable the crossing of the spokes coming from two adjacent arms.

Each of the arms further has two lateral walls 53d and 53e. The lateral walls have an approximately radial orientation, and they are opposite one another for two adjacent arms. Because of the different depth of the two portions 53b and 53c, the lateral walls 53d and 53e have a different height measured along an axial direction. A substantially high lateral wall is opposite a short lateral wall of the adjacent arm.

Each of the arms has two buttonhole-shaped borings 56 and 57, with a large cross-section for engaging the spoke head and a small cross-section for retaining the spoke.

The portion with a small cross-section 58, 59 of each boring is cut out in a lateral wall 53d, 53e of an arm. The portion with a large cross-section 60, 61 is cut out in the disk, at the base of the portion with a small cross-section, and communicates with a portion with a small cross-section.

Contrary to the preceding case, the portions with large and small cross-sections are centered here almost at the same distance from the hub axle. Nevertheless, for a same boring, the portion with a small cross-section is located at the base of the portion with a large cross-section, with reference to the direction in which the spoke exerts a traction on the flange.

As in the preceding case, a portion with a large cross-section has a cutout that is sufficiently large such that the head of a spoke can go through it along a direction close to a direction perpendicular to the disk 47. These directions are schematically defined by the reference numerals 65 and 66 in FIG. 12 for the borings 56 and 57. The portions with small cross-sections are apertures having a width that is substantially equal to the diameter of the spoke body in the vicinity of the head. The spokes are oriented substantially perpendicular to the lateral walls of the arms. These directions are schematically defined by the reference numerals 67 and 68 in FIG. 12. The apertures have a different length, in relation to the different height of the walls and the different depth of the cavities, to enable the crossing of each of the spokes extending from an arm with a spoke coming from an adjacent arm.

The method for retaining the spoke is similar to that which has been described with the preceding embodiment. In the operating position, the disk prevents the spoke from moving away from the center of the hub, and therefore from disengaging accidentally.

As in the preceding case, one could further provide a beam for reinforcing the disk, as well as a washer for sealing the cavities of the barrel.

Alternatively, it would also be possible to provide an arm with a single boring for each of the spokes.

Other alternative embodiments are also possible.

The embodiments that have been described are adapted to any type of spoke, in particular spokes made of aluminum alloy or the like, or spokes made of stainless steel.

It is easily understood that the dimensions of the large cross-section are determined as a function of the dimensions of the spoke head, and the dimensions of the small cross-section are determined as a function of the dimensions of the spoke body. Determining these dimensions is within the reach of the person with ordinary skill in the art.

For the spoke body, it is possible to use an oval body, so as to have an anti-rotation effect by the cooperation of the body with the portion with a small cross-section of the borings.

The present description is provided for guidance only, and other embodiments of the invention could be adopted without leaving the scope thereof.

In particular, a hub could include two flanges with a different diameter.

The instant application is based upon French Patent Application No. 99 16692, filed Dec. 23, 1999, the disclosure of which is hereby incorporated by reference thereto in its entirety, and the priority of which is hereby claimed under 35 U.S.C. §119.

What is claimed is:

1. A hub body adapted to be used with a plurality of spokes, the hub body comprising:

two lateral flanges having buttonhole-shaped borings adapted to provide for hooking the spokes, each of said borings having a large cross-section portion and a small cross-section portion;

each of said flanges including an approximately axial barrel extended by a disk;

said large cross-section portion being located in an area of said disk and said small cross-section portion being located in an area of said barrel;

said small cross-section portion being located at a base of said large cross-section portion, with reference to a direction in which the spokes exert a traction on said flanges when the spokes are mounted and tensioned.

2. A hub body according to claim 1, wherein for a boring, said small cross-section portion is closer to a hub axle than said large cross-section portion.

3. A hub body according to claim 1, wherein said disk is reinforced with a projecting beam or rib.

4. A hub body according to claim 1, wherein said barrel has a main portion and radial arms, each of said arms defining a cavity open on an exterior of one of said flanges and having two lateral walls, each said boring having a small cross-section portion located in an area of said lateral walls and a large cross-section portion located in said disk.

5. A hub body according to claim 4, further comprising two borings per arm, having small cross-sections bored in each of said lateral walls.

6. A hub body according to claim 4, further comprising at least one washer provided to seal, at least partially, at least one of said cavities of said radial arms of said barrel.

7. A hub body according to claim 1, wherein said two lateral flanges are similar.

8. A hub body according to claim 1, wherein said two lateral flanges are different types.

9. A hub body according to claim 1, wherein said two lateral flanges have a nesting portion, and wherein said two lateral flanges are connected by a central spacer.

10. A hub for a bicycle spoke wheel, said hub comprising:

a shaft; and a hub body mounted on said shaft, said hub body comprising:

two lateral flanges having buttonhole-shaped borings adapted to provide for hooking the spokes, each of said borings having a large cross-section portion and a small cross-section portion;

each of said flanges including an approximately axial barrel extended by a disk;

said large cross-section portion being located in an area of said disk and said small cross-section portion being located in an area of said barrel;

said small cross-section portion being located at a base of said large cross-section portion, with reference to a direction in which the spokes exert a traction on said flanges when the spokes are mounted and tensioned.

11. A bicycle spoked wheel comprising:

a rim;

a hub comprising a hub body; and spokes connecting said hub and said rim;

said hub body comprising:

two lateral flanges having buttonhole-shaped borings adapted to provide for hooking the spokes, each of said borings having a large cross-section portion and a small cross-section portion;

each of said flanges including an approximately axial barrel extended by a disk;

said large cross-section portion being located in an area of said disk and said small cross-section portion being located in an area of said barrel;

said small cross-section portion being located at a base of said large cross-section portion, with reference to a direction in which the spokes exert a traction on said flanges when the spokes are mounted and tensioned.

* * * * *